July 29, 1969     J. BRAIMAN     3,458,645
MOLDED CAPACITOR HAVING AN INTEGRAL MOUNTING EAR OR EARS
Filed Aug. 10, 1967

INVENTOR
JERRY BRAIMAN
BY Robert Levine
ATTORNEY

United States Patent Office 3,458,645
Patented July 29, 1969

3,458,645
MOLDED CAPACITOR HAVING AN INTEGRAL MOUNTING EAR OR EARS
Jerry Braiman, Indianapolis, Ind., assignor to P. R. Mallory & Co. Inc., Indianapolis, Ind., a corporation of Delaware
Filed Aug. 10, 1967, Ser. No. 659,696
Int. Cl. H01g 1/02; H05k 5/02
U.S. Cl. 174—52          17 Claims

ABSTRACT OF THE DISCLOSURE

A moulded capacitor having integral, resilient mounting means or ears for releaseably securing the capacitor to a component retaining chassis.

---

The present invention relates to moulded electronic components, and more particularly to moulded capacitors having at least one integral mounting means or ear.

The moulded capacitors are known in the prior art and have been fabricated by a variety of methods using various thermoplastic and thermosetting materials. Several of the moulded capacitors are fabricated so as to inter-fit with a mounting clip which is securely attached to a suitable mounting panel, printed circuit board or the like. The mounting clip affords fairly rapid mounting of the moulded capacitor to a cooperating chassis or other member and prevents deleterious vibration of the capacitor during abusive handling of the chassis.

Although satisfactory for its intended purpose, the several prior art clamps do have drawbacks. For example, in order to securely retain the moulded capacitor in a determined relationship with respect to the chassis, several of the prior art clamps include securing lances or tongues which may gouge into the housing of the molded capacitor. Although the gouging by the tongues of the housing is designed to be held to a minimum, it has been found that on occasion the tongue or tongues may completely penetrate the side wall of the housing to the cavity retaining the capacitor body thereby substantially destroying the intended purpose of the housing of providing a sealed closure. If the moulded capacitor is a wet electrolytic capacitor, electrolyte will leak through the perforation onto the chassis and/or surrounding electronic components. Due to the corrosive nature of the electrolyte, corrosion of the metal parts of the chassis and/or electronic components takes place. Even if the tongue of the clamp does not completely penetrate the side wall of the housing of the capacitor, the tongue may gouge the housing sufficiently to produce pressure weak localized area in the housing which may rupture upon an increase in the internal pressure due to the evolution of a gas or gases. The rupture may allow electrolyte to escape from the housing. Regardless of whether or not the capacitor is a moulded solid electrolyte capacitor or a moulded wet electrolyte capacitor, it should be seen that the several prior art types of clamps may impair the effectiveness of the capacitor seal. An effective capacitor seal is important if the capacitor is to function as designed.

It was found that by integrally moulding mounting ears with the capacitor housing, the mounting ears serve the functions of providing a mounting means whereby utilization thereof does not impair the seal of the capacitor, of providing firm support for the capacitor when the chassis to which the moulded capacitor is attached is subjected to abusive handling, and of providing a relatively large contact area or base for stabilizing the capacitor during both normal and abusive handling such as during shock. In addition, it was found that the integral mounting ear or ears may be provided with integral resilient studs which facilitate the locking of the capacitor body to the chassis.

Accordingly, it is an object of the present invention to provide an economically encapsulated capacitor which overcomes each of the aforementioned problems in the moulded capacitor art.

Another object of the present invention is to provide a moulded capacitor having integral mounting ears which affords rapid mounting of the moulded capacitor to a mounting chassis.

Yet another object of the present invention is to provide a capacitor having integral mounting ears which provide stabilization for the capacitor housing when the capacitor is mounted on a mounting chassis.

Yet still another object of the present invention is to provide a moulded capacitor having integral mounting ears including stud projections or means having such shape so as to afford smooth entry under moderate pressure into apertures provided in the mounting chassis with a locking action relative thereto against withdrawal of the stud means therefrom.

A further object of the present invention is to provide a moulded capacitor having integral mounting ears which have a positive locking action with a mounting chassis.

Another object of the present invention is to provide a moulded capacitor having integral mounting ears that is characterized by its simplicity of construction and its economy of fabrication.

Still another object of the present invention is to provide a moulded capacitor having integral mounting ears that acurately and automatically locate and position the capacitor housing in spaced parallel relationship with a mounting chassis or printed circuit board.

The present invention, in another of its aspects, relates to the novel features of the instrumentalities of the invention described herein for teaching the principal objects of the invention and to the novel principles employed in the instrumentalities whether or not these features and principles may be used in the said objects and/or in the said field.

With the aforementioned objects enumerated, other objects will be apparent to those persons possessing ordinary skill in the art. Other objects will appear in the following description, appended claims, and appended drawings. The invention resides in the novel construction, combination, arrangement and cooperation of elements as hereinafter described and more particularly as defined in the appended claims.

The appended drawings illustrate an embodiment of the present invention constructed to function in the most advantageous modes devised for the practial application of the basic principles involved in the hereinafter described invention.

Figures 5, 6:
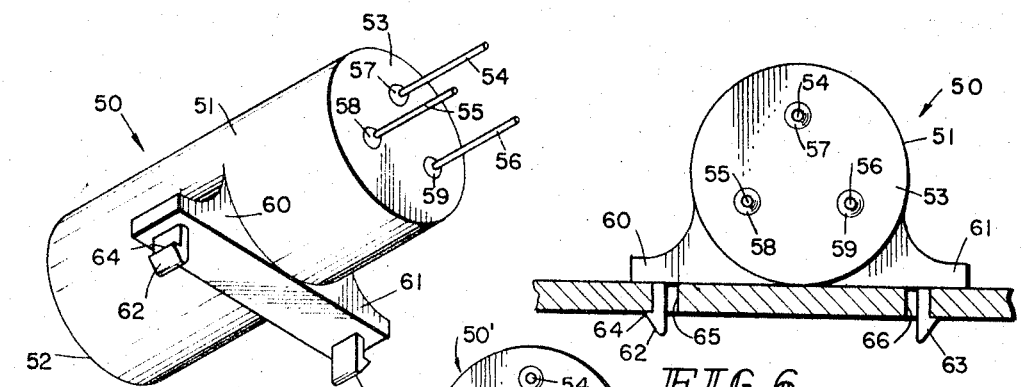

FIGURE 5 is a perspective view of a moulded three-terminal capacitor device including a plurality of mounting ears for locking said capacitor device to a mounting chassis so as to provide firm support and prevent the capacitor from being displaced relative to the mounting chassis during abusive handling thereof; and FIGURE 6 is a partial side view of the moulded three-terminal capacitor device shown in FIGURE 5 illustrating the mounting studs engaged with a chassis.

Figure 7:
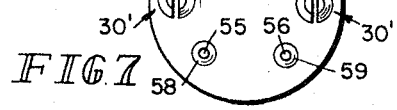

FIGURE 7 is an end view of a three-terminal capacitor device wherein the mounting studs are integral with a terminal end so that the capacitor may be vertically mounted on a chassis.

Generally speaking, the present invention relates to a moulded capacitor having integral mounting ears which provide a positive locking action with a chassis. The capacitor housing is moulded from a plastic material selected from the group consisting of thermoplastic and thermosetting materials. A base having a substantially flat bottom portion is integral with the housing and provides support therefor when cooperatively associated with the chassis. Resilient stud means are integrally formed with the base and extend therefrom at opposite extremities of the base. The apertured chassis has apertures which correspond to the location of the stud means. The stud means has a flanged portion that extends beyond the corresponding aperture on the chassis. Each of the stud means is adapted to be received in the corresponding aperture of the base upon application of force thereto. The material of the stud means is compressed when passing through the corresponding aperture so that as the flange portion of the stud means emerges from the aperture, the flange portion expands and engages with an edge of the chassis and locking relation thereby effectively securing the capacitor housing to the chassis.

Figure 1:
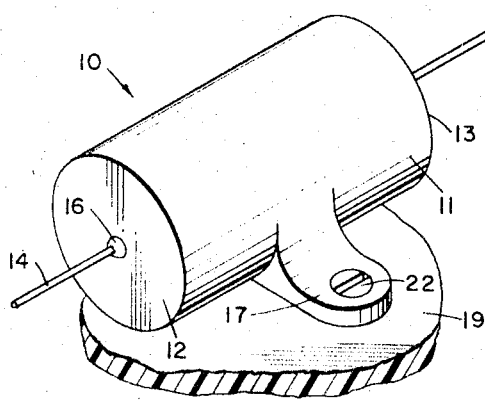
FIGURE 1 is a perspective view showing a moulded, axial lead capacitor device having at least one integral apertured mounting ear that is used to mount the capacitor to a chassis.

Referring now to FIGURE 1 of the drawing, a moulded capaciitor is generally indicated by reference numeral 10. The capacitor is comprised of a capacitor body (not shown), a housing 11, a terminal end 12, a terminal end 13, and integral mounting ears 17 and 18. Terminal end wires 14 and 15 project respectively from the capacitor body through terminal ends 12 and 13. A moulded sealing tit formation 16 provides an effective seal around the periphery of the terminal wire 14. A tit formation (not shown) provides an effective end seal around the periphery of terminal wire 15 in a manner similar to that of tit formation 16. The tit formations project from the terminal ends as shown in FIGURE 1 and effectively seal the capacitor housing engaging the terminal wires by circumscribing the terminal wires. It was found that no special ancillary end seals were necessary to insure tightness of the end seal around terminal wires 14 and 15 as the closure material effects an adequate bond thereto.

The housing 11 encapsulating the capacitor body (not shown) may be fabricated from any suitable thermoplastic material such as polypropylene, polyethylene, polyamide, polystyrene, polycarbonate and polyurethane resins. In addition, the housing may be fabricated from thermosetting type resins or plastics such as epoxies, phenolics, polyesters and the like.

Figure 2:
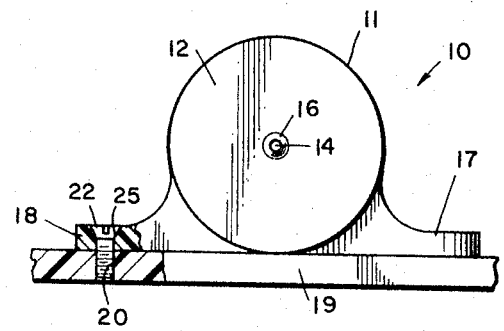
FIGURE 2 is a side view of the moulded, axial lead capacitor device illustrated in FIGURE 1 showing the capacitor fixedly connected to the chassis by the use of a fastening means projecting through the aperture of the integral ear so as to engage with the aperture in the chassis.

The mounting ears 17 and 18 are integrally formed with the housing 11 and project therefrom in opposite directions a determined distance and are substantially perpendicular to the axis of the housing. It should be noted that the mounting ears are fabricated from the same plastic material as is the housing of the capacitor. As is shown in FIGURE 2, the lower side, i.e., the side abutting the chassis, of the integral mounting ears is substantially flat and encompasses a relatively large surface area so as to provide a large area of contact with the chassis 19. The upper trailing edge of each of the mounting ears includes a curved section that extends nearly halfway up the periphery of the housing of the capacitor to thereby provide a large surface area contact with the housing thereby providing a wide base of support. An aperture 25 is formed in each of the mounting ears as is shown by the partial cross-sectional view of one of the mounting ears in FIGURE 2. Aperture 25 is located in the mounting ear so as to overlie an aperture 20 formed in the chassis. A similar chassis aperture (not shown) and a mounting ear aperture (not shown) are provided in mounting ear 17. A fastening means 22 such as a bolt, screw, or the like is turned into aperture 19 and into aperture 20 of the chassis so as to secure the moulded capacitor to the chassis. The aperture 25 of the integral mounting ear may be countersunk so that the head of the fastening means is substantially flush with the uppermost surface of the mounting ear. Mounting ear 17 may also be cooperatively associated with a fastening means (not shown) that performs a function similar to that of fastening means 20.

Figure 3:
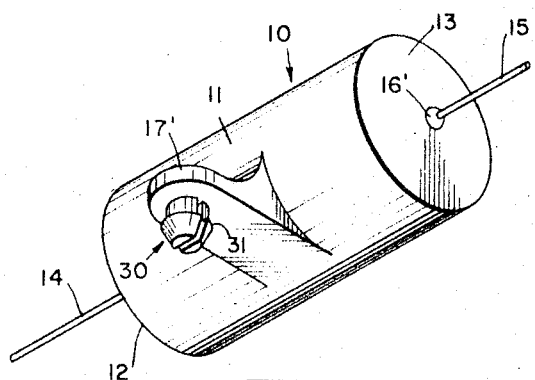
FIGURE 3 is a perspective view of a moulded, axial lead capacitor having an integral mounting ear that includes a resilient stud which provides a positive locking action with an edge of an aperture in a mounting chassis to thereby substantially prevent displacement of the capacitor with respect to the mounting chassis during abusive handling of the chassis.
Figure 4:
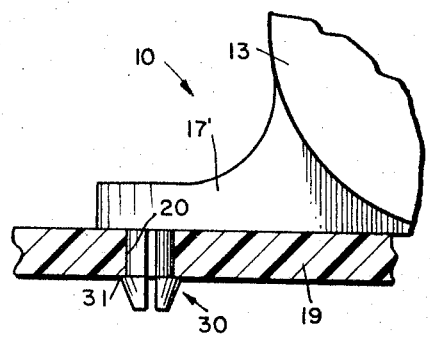
FIGURE 4 is a partial side view of the moulded, axial lead capacitor shown in FIGURE 3 illustrating the cooperative relationship between the stud and the mounting chassis.

FIGURE 3 shows a moulded capacitor 10 including substantially the same component parts as the moulded capacitor illustrated in FIGURE 1. The moulded capacitor of FIGURE 3 may be classified as an "axial lead" moulded capacitor. The capacitor includes terminal ends 11 and 12, axial leads 14 and 15, tit formations circumscribing the axial lead wires so as to form an effective end seal such as shown at 16', and an integral mounting ear 17' including stud 30 extending therefrom at an angle substantially perpendicular to the major axis of the mounting ear. The shape of the stud 30 is such as to afford smooth entry of the stud into an aperture of a mounting chassis 19 as shown in FIGURE 4 under moderate pressure, i.e., the leading edge of the stud being chamfered or rounded is compressed as the leading edge of the stud enters and progresses through the aperture in the mounting chassis. Upon exit of the leading edge of the stud through the mounting chassis, the stud expands to its normal position and a flanged edge or shoulder 31 thereof engages with the under side of the chassis thereby effectively locking the capacitor to said chassis. The stud illustrated in FIGURE 4 and FIGURE 5 has a double D-shaped cross section to facilitate passage of the stud through the aperture and subsequent locking thereof with the under side of the chassis. Note that a channel separates the respective sections of the stud.

A modified form of the present invention is shown in FIGURE 5. A three-terminal capacitor device 50 is shown therein. Note that all of the terminals thereof project from one terminal end of the housing. The three-terminal device includes a housing 51, terminal ends 52 and 53 and terminal leads or wires 54, 55 and 56, each projecting from terminal end 53. Moulded sealing tit formations 57, 58 and 59 respectively seal the terminal wires 54, 55 and 56. The housing has integrally moulded therewith a plurality of mounting ears 60 and 61. The integral mounting ears include studs 62 and 63 for engaging with and positively locking the housing of the capacitor to a mounting chassis. As shown in FIGURE 6, the shape of studs 62 and 63 are such as to afford smooth entry of each of the studs into apertures formed in chassis 19 under moderate pressure. It will be seen that the leading edges of the studs are angulated thereby providing for smooth passage through the aperture in the mounting chassis. As the studs 62 and 63 pass through their respective cooperatively associated apertures 65 and 66, the studs are compressed toward one another thereby storing energy therein and upon exit of a determined portion of the stud from the aperture, the stud releases its stored energy and returns to its normal position. Each of the studs includes a flange or shoulder 64 which will lock with the mounting chassis to thereby securely seat the capacitor thereto.

The aforementioned integral mounting ears do not require the use of ancillary hardware or special tools in securing the same to mounting chassis 19. It should be seen that the embodiments in FIGURES 3–6 are substantially complete in and of themselves as far as locking features are concerned. The integral mounting ears may be modified so as to be adaptable to several purposes such as including more studs and/or larger studs for securing larger components to the chassis. The mounting ears may also be parallel rather than perpendicular to the axis of the tubular housing where space requirements demand such a design. The mounting ears may also be located on a terminal end of the housing where the housing is mounted on the chassis with its major axis perpendicular to the major axis of the chassis. FIGURE 7 shows a capacitor 50' wherein the mounting studs 30' are integral with terminal end 53 and extend therefrom.

The capacitor body contained within the housing may be a convolutely wound capacitor body having foil plates fabricated from any suitable film-forming material such as aluminum, tantalum, and the like. The respective foil plates are separated from one another by any suitable dielectric material such as porous paper and the like. The porous paper is impregnated with any suitable electrolyte of several electrolytes such as ethylene glycol-boric acid-ammonia compounds or the like. In addition, the capacitor body may be a sintered anode fabricated from any suitable film-forming material such as, for example, tantalum, niobium, and the like. A solid dielectric oxide film is formed on the sintered anode. A suitable semiconductive film formed on the anode would be manganese dioxide.

While the invention is illustrated and described in embodiments, it will be understood that modifications and variations may be effected without departing from the scope and novel concepts of this invention as set forth in the appended claims.

Having thus described my invention, I claim:

1. In a capacitor in combination with an apertured chassis, a capacitor housing moulded from a plastic material selected from the group consisting of thermoplastic and thermosetting materials, means having a substantially flat bottom portion integral with said housing for providing support for said housing on said chassis, resilient stud means integrally formed with said means and extending therefrom, said apertured chassis having apertures corresponding to said stud means, said stud means having a flanged portion extending beyond the corresponding aperture in said chassis, each of said stud means being adapted to be received in said corresponding aperture in said base upon the application of force thereto, the material of said stud means being compressed when passing through said corresponding aperture so that as said flanged portion of said stud means emerges from said aperture said flanged portion expands and engages with an edge of said chassis in locking relationship thereby effectively securing said capacitor housing to said chassis.

2. In a capacitor in combination with an apertured chassis as claimed in claim 1, wherein said means includes integral ears extending in opposite directions from said housing.

3. In a capacitor in combination with an apertured chassis as claimed in claim 1, wherein said stud means includes a double D-shaped cross section and a shoulder engaging with an edge of said chassis in a locking relation thereby effectively securing said capacitor to said chassis.

4. In a capacitor in combination with an apertured chassis as claimed in claim 3, wherein said double D-shaped stud means includes a channel separating respective sections of said stud means.

5. In a capacitor in combination with an apertured chassis as claimed in claim 1, where said base includes curved trailing edges that extend substantially halfway up the periphery of said housing thereby providing a large support base for said housing.

6. In a capacitor in combination with an apertured chassis as claimed in claim 1, wherein said means is a terminal end of said housing and said stud means project therefrom substantially parallel to the major axis of said housing so that said housing may be vertically mounted on said chassis.

7. In a capacitor in combination with an apertured chassis as claimed in claim 6, wherein said capacitor is a three-terminal device having said three terminals projecting from said terminal end carrying said stud means.

8. In a capacitor in combination with an apertured chassis as claimed in claim 7, wherein said stud means is double D-shaped.

9. In a capacitor in combination with an apertured chassis as claimed in claim 1, wherein said stud means are positioned along the major axis of said capacitor and perpendicular thereto.

10. In combination, an apertured chassis and an electrolytic capacitor including a substantially cylindrical housing of a plastic material and terminal wires projecting from said housing, said housing including an integral mounting means extending from said housing, said mounting means including a base having a substantially flat bottom portion providing support for said housing on said chassis and an integral thickened section extending from said base to the periphery of said housing for providing support for said housing.

11. The combination as claimed in claim 10, wherein said thickened section includes a concaved periphery extending from about said base to said periphery of said housing.

12. The combination as claimed in claim 11, further including formations integral with said housing and substantially circumscribing said terminal wires whereby a tight seal around said terminal wires is provided.

13. The combination as claimed in claim 10, wherein said mounting means includes a mounting ear extending from said cylindrical portion of said housing at about a right angle thereto.

14. The combination as claimed in claim 10, wherein said mounting means includes at least two mounting ears oppositely extending from said cylindrical portion of said housing each at about a right angle thereto.

15. The combination as claimed in claim 13, wherein said mounting ear includes integral stud means projecting therefrom for engaging with said apertures of said chassis whereby said capacitor is secured to said chassis so that the axis of said cylindrical housing of said capacitor is substantially parallel to the plane of said chassis.

16. The combination as claimed in claim 15, wherein said stud means is a means having a double D-shaped cross section and a shoulder for engaging with an edge of said chassis in a locking relation whereby said capacitor is secured to said chassis.

17. The combination as claimed in claim 15, wherein said stud means is a means having a hook-like cross section including a shoulder for engaging with an edge of said chassis in a locking relation whereby said capacitor is secured to said chassis.

References Cited

UNITED STATES PATENTS

| | | | |
|---|---|---|---|
| 1,763,115 | 6/1930 | Wermine. | |
| 2,552,999 | 5/1951 | Pannell et al. | 336—96 |
| 2,558,798 | 7/1951 | Thom | 338—315 X |
| 2,628,342 | 2/1953 | Taylor | 336—96 X |
| 3,154,281 | 10/1964 | Frank. | |
| 3,238,489 | 3/1966 | Hay. | |

LEWIS H. MYERS, Primary Examiner

D. A. TONE, Assistant Examiner

U.S. Cl. X.R.

338—317